Dec. 5, 1961  R. W. FULMER  3,011,676
METALLIC CONTAINERS
Filed Jan. 29, 1960

INVENTOR.
RICHARD W. FULMER
BY
ATTORNEY

United States Patent Office 3,011,676
Patented Dec. 5, 1961

3,011,676
METALLIC CONTAINERS
Richard W. Fulmer, Minneapolis, Minn., assignor to General Mills, Inc., a corporation of Delaware
Filed Jan. 29, 1960, Ser. No. 5,556
5 Claims. (Cl. 220—81)

This invention relates to metallic containers and in particular to metallic containers having seams bonded with an adhesive or cement composed of the reaction product of (A) an imino-linked polymer of a polyamine and epoxidized fatty acids or esters with (B) epoxy resins.

In the past, metallic containers have had their seams bonded with metallic solder. Various resins have been proposed for cementing the seams of such containers as a substitute for the solder. However, in general, such resins have not been entirely successful in becoming a substitute for the metallic solder. One deficiency common to many of the resins proposed is poor adhesion to many of the metal surfaces. It has now been found that containers having their seams bonded with an adhesive which is the reaction product of an imino-linked polymer and epoxy resins are as good as or superior in many respects to metallic cans or containers having their seams bonded with metallic solder.

It is therefore an object of this invention to provide a container having seams bonded with an adhesive of an imino-linked polymer and an epoxy resin.

Figure 1:
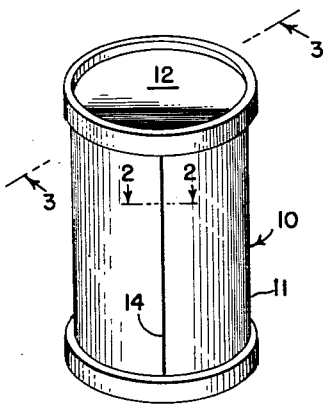
Figure 2:
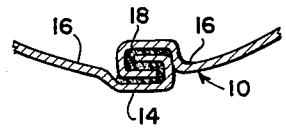
Figure 3:
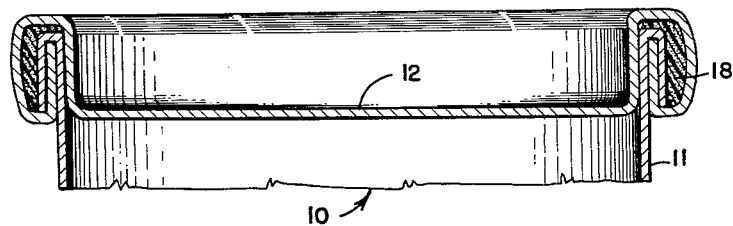

In the drawing:
FIGURE 1 is a perspective view of a metallic container;
FIGURE 2 is a partial sectional view taken along line 2—2 of FIGURE 1, showing in detail a side seam of the container; and
FIGURE 3 is a partial sectional view along line 3—3 of FIGURE 1, showing in detail the end closure and seam of the container.

In making metallic containers such as cans the operation is highly mechanized and automatic devices are used which serve to form and shape the parts and to bring the parts together for formation of seams. These devices are mechanically timed and operate at high rates of speed. Successive parts to be joined follow one another in very short intervals. Moreover automatic can-making machines are equipped with thermostatically controlled heaters which heat the adhesive to a specific and limited temperature range at which the adhesive is soft or liquid. It is essential in such operation that the bonding agent at this temperature be sufficiently soft and have suitable viscosity characteristics such that it will flow onto the seam portion of the can and such that it will develop adhesive characteristics within a certain limited period of time. It is important that the bonded seams will not fail when the can is subjected to ordinary handling in manufacture, packing and shipping. In addition the products in the cans should not in any way be affected by the metallic container or the adhesive used. In the case of cans for solvents and oils the adhesive must not be soluble in these materials but should retain its adhesive properties under such circumstances.

Referring to the drawing, a container 10 is shown in FIGURE 1 having a body 11 and end closure 12 and side seam 14. FIGURE 2 shows the side seam 14 in detail which is composed of interfolded layers 16 with an adhesive 18 therebetween. A seam by which the end closure 12 is joined to body 11 is shown in FIGURE 3. Again the seam is formed of interfolded layers with the adhesive 18 therebetween.

The containers of the present invention may be made of any metal conventionally used in making containers. Illustrative of the metals which are used are steel, aluminum, copper, bronze, tin plate and the like. As the containers are generally formed of sheet metal, the seams are usually formed of interfolded metal layers. An adhesive is used in the seams to serve to strengthen the mechanical joints formed during can manufacture, thereby yielding a stronger and more rigid container. The adhesive also serves as a sealant to contain fully the ingredients of the container which is impossible of accomplishment by mechanical means alone. Since the cements of this invention are two component cements which components will react when blended, the separate components of the adhesive will have to be mixed in a two component mixing and measuring device which would extrude into place a bead of the mixed cement so that reaction can take place in situ in the seam of the container.

As stated previously the adhesive used in the seams of the present containers is the reaction product of an imino-linked polymer and epoxy resins. The epoxy resins which may be employed are complex polymeric reaction products of polyhydric mono and polynuclear phenols with polyfunctional halohydrins and/or glycerol dichlorohydrin. A large number of epoxy resins of this type are disclosed in Greenlee Patents 2,585,115 and 2,589,245. In addition, several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenyl) propane (Bisphenol A), the resin having the following theoretical structural formula,

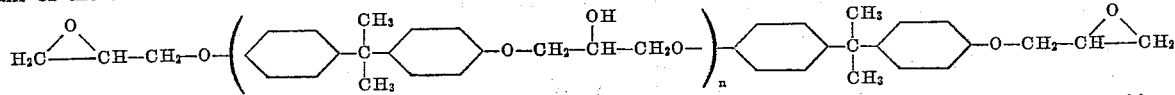

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent weight of pure epoxy resins being the molecular weight of the resin divided by the mean number of epoxy radicals per molecule, or in any case the number of grams of resin per 1 gram- equivalent of epoxide. While certain specific epoxy resins which are the most readily available have been described, it is understood that the epoxy resinous compositions encompassed by this invention are those liquid epoxy resins having an epoxy equivalent weight of 140 to 300, the preferred epoxy equivalent weight being 170 to 220, expressed in terms of grams of compound per epoxy group.

The imino-linked polymers employed in this invention are complex amino-containing imino-linked-polyamides-polyimidazolines derived from epoxidized monocarboxylic fatty acids or esters and polyamines.

The epoxy fatty acid compounds, i.e. fatty acid esters and fatty acids, employed in this invention may be prepared in any of the known methods, from any of the various unsaturated fatty acids. The fatty acids are a cheap and readily available natural raw material source. In nature they exist as mixtures of saturated and unsaturated fatty acids of varying chain lengths, frequently characterized as containing from 8 to 22 carbon atoms. In general the esters which may be employed are the alkyl esters, the alkyl groups containing from 1 to 5 carbon atoms. Preferably the lower alkyl esters having from 1 to 2 carbon atoms are used. The bulk of the unsaturated acids contain 18 carbon atoms with the exception of undecylenic acid which is prepared by the decomposition of ricinoleic acid. Illustrative sources of the unsaturated fatty acids are tall oil, soybean oil, linseed oil, cottonseed oil, rapeseed oil, fish oils and the like. One method of preparing the epoxidized material is to react any of the various unsaturated fatty acids with peracetic acid at about room temperature. The peracetic acid may be preformed before the epoxidation step or formed in situ by any one of the well known processes involving sulfonic acid resins utilizing hydrogen peroxide and acetic acid. Epoxidation can also be performed by the use of formic acid and hydrogen peroxide. The epoxides can also be prepared by addition of hypochlorous acid to the carbon-carbon double bond followed by dehydrochlorination.

Epoxidized compounds of any oxirane oxygen content may be employed in this invention. Maximum oxirane oxygen content is, of course, limited by the amount of unsaturation present in the fatty materials which are epoxidized. In general, the materials used in this invention will have an oxirane oxygen content of from 1 to 6%.

The polyamines which may be employed for reaction with the epoxidized fatty acid compounds are those polyamines having the general structural formula $$H_2N(RNH)_xH$$

where R is an alkylene radical having from 1 to 8 carbon atoms and $x$ is an integer from 2 to 8. The preferred class of compounds are the ethylene polyamines which also form imidazoline linkages in the reaction; however, the propylene and other higher polyamines may be used. Illustrative of the polyamines which may be used are triethylene tetramine and tetraethylene pentamine, di-1,3, propane triamine and the like.

The polyamine will be employed in an amount necessary to provide an excess of amino groups over the functional groups of the epoxidized material (epoxy plus carboxyl groups combined), or in other words more than 1.0 amine equivalents per total functional equivalents. In general, a maximum of one mole of polyamines is preferred per functional group (epoxy and carboxyl). The lower limit is of course dependent on the particular polyamine employed, dependent on the number of amino groups in the polyamine. For example, with diethylene triamine, having 3 amino groups per molecule, an amount in excess of ⅔ mole is required, ⅔ of a mole providing only 1.0 amine equivalent per total functional equivalents. In the case of tetraethylene pentamine having 5 amino groups per molecule, an amount in excess of ⅖ mole is required.

It is possible to carry out the reaction in several ways. One preferred method is to carry out the reaction at about 150° C., at which temperature the polyamino compound or compounds react to form both imidazoline and amide linkages. Another method is to carry out the reaction at about 100° C., in which case the formation of amide linkages are favored, or at 200° C. and above at which temperatures imidazoline linkages are favored. In any case the reaction temperature should not exceed 300° C., since deleterious side effects have been observed at this temperature. Generally, a period of 1 to 8 hours is sufficient in the temperature range of 100–300° C.

The product is a fluid resin having a Brookfield viscosity in the range of 10 to 3000 poises at 25° C., and an amine number range of from 200 to 700. The amine number is described as the number of milligrams of potassium hydroxide equivalent to the amount of amine in a one gram sample of resin. Generally it will be preferred that the viscosity be in the range of 10–100 and the amine number in the range of 450–650.

The epoxy resin is then mixed with the imino-linked polymer, placed in the seam of the metallic container and cured. The number of epoxy groups in the quantity of epoxy resin used is never enough to fully neutralize the complete amino reactivity of the imino-linked polymers. At the completion of the reaction no oxirane oxygen remains, whereas amino reactivity is retained which greatly contributes to the adhesive quality of the seams. If no excess of the amino groups remained, or in other words amino reactivity exactly equaled oxirane activity, the resulting thermoset resin would be too brittle and rigid to be effective as a seam cement.

In general the adhesives utilized in the present invention are composed of from 60 to 75 parts by weight of the imino-linked polymer to 40 to 25 parts by weight of the epoxy resin.

In addition, inorganic fillers can be added to the resinous matrix to effect some special property of the cement. For example, amorphous silica may be added to control flow and cause the cements to remain in place in the can seam without flowing out during cure. Other fillers contemplated for use in the present cements are iron oxide, bentonite clays, aluminum powder, carbon black, kaolin clays, talc, other metal oxides and metals.

The adhesive can be tested by applying it between two strips of can maker's quality black plate one inch wide for a length of about an inch. A cement layer of about 3 to 5 mils thickness is formed between the bonded strips and the sample cured at 300° F. for ten minutes in a forced draft oven. The two uncemented ends are then drawn over a plurality of ½ inch ball bearing rollers suspended in a jig which is hung or suspended in a Dillon Tester. The ends of the strips are then pulled over the rollers in the Dillon Tester at a rate of one inch per minute. The tear burst values recorded are the averages of five specimens.

The invention can best be illustrated by means of the following examples in which all "parts" are parts by weight. The epoxy resin used for convenience in the following examples was derived from Bisphenol A and epichlorohydrin and had an epoxy equivalent weight of about 195.

*Example I*

| Imino-Linked Polymer,[1] parts by wt. | Epoxy Resin, parts by wt. | Average Tear Burst Value, lbs. |
|---|---|---|
| 75 | 25 | 74 |
| 70 | 30 | 127 |
| 65 | 35 | 94 |

[1] Prepared from methyl ester of epoxidized tall oil fatty acids and triethylene tetramine (amine value 380).

*Example II*

| Imino-Linked Polymer,[2] parts by wt. | Epoxy Resin, parts by wt. | Average Tear Burst Value, lbs. |
|---|---|---|
| 75 | 25 | 115 |
| 70 | 30 | 115 |
| 65 | 35 | 23 |

[2] Prepared from methyl esters of epoxidized tall oil fatty acids and tetraethylene pentamine (amine value 395).

*Example III*

| Imino-Linked Polymer,[3] parts by wt. | Epoxy Resin, parts by wt. | Average Tear Burst Value |
|---|---|---|
| 70 | 30 | Does not gel. |
| 65 | 35 | 28 lbs. |
| 60 | 40 | 96 lbs. |

[3] Prepared from methyl esters of epoxidized tall oil fatty acids and tetraethylene pentamine (amine value 600).

Example IV

The addition of fillers serves the purpose of controlling undesirable flow of the cement. During can manufacture the elevated temperature used to cure the cement tends to thin out the resin and causes it to flow out of the joint. To control this flow it is necessary to add thixotropic agents such as amorphous silica. The effect of the addition of such inert fillers on tear burst strength is shown below.

| Reactant With Epoxy Resin | Ratio | Fillers | Average Tear Burst Values, lbs. |
|---|---|---|---|
| Imino-Linked Polymer [1] | 70/30 | Control | 127 |
|  | 70/30 | 10 p.b.w. Iron Oxide | 117 |
|  | 70/30 | 5 p.b.w. Amorphous Silica | 105 |
|  | 70/30 | 30 p.b.w. Bentone 34 | 67 |
| Imino-Linked Polymer [2] | 75/25 | Control | 115 |
|  | 75/25 | 10 p.b.w. Iron Oxide | 111 |

[1] Prepared from methyl ester of epoxidized tall oil fatty acids and triethylene tetramine (amine value 380).
[2] Prepared from methyl esters of epoxidized tall oil fatty acids and tetraethylene pentamine (amine value 395).

From the above table it will be noted that amorphous silica can be added without materially affecting tear burst values. Thus amorphous silica is an effective thixotropic agent which can control flow during the manufacturing process without disturbing the strength factor. Iron powder (iron oxide) also serves to increase viscosity of the cement and does not detract materially from the tear burst value. Bentone 34, (dimethyl dioctadecyl ammonium bentonite) another thixotropic agent, tends to reduce the tear burst values even though it does control flow. Metallic containers made in the conventional manner using the present cements in the seams are rigid and the seams will not fail under ordinary handling in manufacturing, packing and shipping.

The embodiments of the invention in which an exclusive property or privilege is claimed are defined as follows:

1. A metallic container having seams, said seams being bonded by a resinous composition, said resinous composition comprising an epoxy resin of a polyhydric phenol and a polyfunctional halohydrin having an epoxy equivalent weight of from 140 to 300, and an imino-linked polymer of a polyalkylene polyamine and an epoxidized compound selected from the group consisting of the epoxidized fatty acids and the alkyl esters thereof, said fatty acids having from 8 to 22 carbon atoms and said alkyl group having from 1 to 5 carbon atoms, said polyamine having the formula $H_2N(RNH)_xH$ where R is an alkylene radical having from 1 to 8 carbon atoms and $x$ is an integer from 2 to 8 said imino-linked polymer having an amine number of from 200–700.

2. A metallic container as defined in claim 1, in which said epoxidized compound is the epoxidized methyl ester of tall oil fatty acids.

3. A metallic container as defined in claim 1, in which said epoxidized compound is the epoxidized methyl ester of soybean oil fatty acids.

4. A metallic container as defined in claim 1, wherein R is ethylene.

5. A metallic container as defined in claim 1, in which said epoxy resin is employed in an amount of from 40 to 25 parts by weight and said imino-linked polymer is employed in an amount of from 60 to 75 parts by weight.

References Cited in the file of this patent

UNITED STATES PATENTS

| 2,919,255 | Hart | Dec. 29, 1959 |

FOREIGN PATENTS

| 810,348 | Great Britain | Mar. 11, 1959 |
| 1,181,817 | France | Jan. 12, 1959 |